(12) United States Patent
Schneider et al.

(10) Patent No.: US 10,029,671 B2
(45) Date of Patent: Jul. 24, 2018

(54) METHODS RELATING TO EXHAUST AFTER-TREATMENT DEVICES

(71) Applicant: Ford Global Technologies, LLC, Dearborn, MI (US)

(72) Inventors: Matthew Allen Schneider, Aachen (DE); Frank Linzen, Aachen (DE); Dirk Roemer, Cologne (DE); Frederik De Smet, Genk (BE); Jan Harmsen, Simpelveld (NL); Kim Ford, Basildon (GB); Javier Castellano, Hornchurch (GB); Andres Arevalo, London (GB); Monika Angst, Aachen (DE); Mario Balenovic, Waalre (NL); Evgeny Smirnov, Aachen (DE); Robert Ukropec, Herzogenrath (DE); Christian Winge Vigild, Aldenhoven (DE); Felix Goebel, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/045,489

(22) Filed: Feb. 17, 2016

(65) Prior Publication Data
US 2016/0251012 A1 Sep. 1, 2016

(30) Foreign Application Priority Data

Feb. 18, 2015 (DE) .................. 10 2015 202 885
Feb. 18, 2015 (DE) .................. 10 2015 202 887

(Continued)

(51) Int. Cl.
*F02M 26/01* (2016.01)
*B60W 20/16* (2016.01)
(Continued)

(52) U.S. Cl.
CPC ............ *B60W 20/16* (2016.01); *B60W 10/06* (2013.01); *B60W 10/08* (2013.01); *F01N 3/0842* (2013.01);
(Continued)

(58) Field of Classification Search
USPC .... 701/108, 103, 104, 22; 60/295, 274, 278, 60/282, 285, 317
See application file for complete search history.

(56) References Cited

U.S. PATENT DOCUMENTS 5,584,265 A * 12/1996 Rao ................... B01D 53/90
123/1 A
6,138,784 A * 10/2000 Oshima ............. B60K 13/00
180/65.2

(Continued)

FOREIGN PATENT DOCUMENTS

DE 19823921 A1 12/1999
DE 19855090 A1 5/2000
(Continued)

OTHER PUBLICATIONS

Fremerey, Peter, Determination of the NOx Loading of an Automotive Lean NOx Trap by Directly Monitoring the Electrical Properties of the Catalyst Material Itself, Aug. 25, 2011, MDPI, (www.ncbi.nlm.nih.gov/pmc3231517/), last accessed Jan. 30, 2018.*

*Primary Examiner* — Richard A Goldman
(74) *Attorney, Agent, or Firm* — Julia Voutyras; McCoy Russell LLP

(57) ABSTRACT

An operating method for a motor vehicle having a hybrid drivetrain includes, during a demand check, comparing at least one value which characterizes a current state of an exhaust-gas after-treatment device, with a setpoint value of the exhaust-gas after-treatment device. In response to the comparison indicating a deviation of the value characteriz- (Continued)

ing the current state of the exhaust-gas after-treatment device from the setpoint value, a demand for a measure is indicated. The measure includes supplying charge gas, which includes recirculated exhaust gas, to the internal combustion engine during overrun operation. In addition, a capability check is carried out to detect conditions suitable for implementing the operating method.

20 Claims, 5 Drawing Sheets

(30) Foreign Application Priority Data

| Feb. 18, 2015 | (DE) | 10 2015 202 892 |
|---|---|---|
| Feb. 18, 2015 | (DE) | 10 2015 202 893 |
| Feb. 18, 2015 | (DE) | 10 2015 202 896 |
| Feb. 18, 2015 | (DE) | 10 2015 202 897 |
| Feb. 18, 2015 | (DE) | 10 2015 202 898 |
| Feb. 18, 2015 | (DE) | 10 2015 202 899 |
| Feb. 18, 2015 | (DE) | 10 2015 202 903 |
| Feb. 18, 2015 | (DE) | 10 2015 202 904 |

(51) Int. Cl.

| F02D 41/00 | (2006.01) |
|---|---|
| F02D 41/02 | (2006.01) |
| B60W 10/06 | (2006.01) |
| B60W 10/08 | (2006.01) |
| F01N 3/20 | (2006.01) |
| F02D 41/12 | (2006.01) |
| F02D 41/14 | (2006.01) |
| F01N 3/08 | (2006.01) |
| F01N 9/00 | (2006.01) |
| F01N 3/36 | (2006.01) |

(52) U.S. Cl.
CPC ............. *F01N 3/2066* (2013.01); *F01N 9/00* (2013.01); *F02D 41/0055* (2013.01); *F02D 41/0235* (2013.01); *F02D 41/0275* (2013.01); *F02D 41/123* (2013.01); *F02D 41/1463* (2013.01); *B60W 2400/00* (2013.01); *B60W 2550/20* (2013.01); *B60W 2550/402* (2013.01); *B60W 2710/0644* (2013.01); *F01N 3/36* (2013.01); *F01N 2610/02* (2013.01); *F01N 2610/03* (2013.01); *F01N 2610/1453* (2013.01); *F01N 2900/0408* (2013.01); *F01N 2900/08* (2013.01); *F01N 2900/10* (2013.01); *F01N 2900/1402* (2013.01); *F01N 2900/1606* (2013.01); *Y02A 50/2325* (2018.01); *Y02T 10/24* (2013.01); *Y02T 10/47* (2013.01); *Y10S 903/93* (2013.01)

(56) References Cited

U.S. PATENT DOCUMENTS

| 7,886,523 | B1* | 2/2011 | Legare | F01N 3/00 60/285 |
|---|---|---|---|---|
| 8,601,813 | B2* | 12/2013 | Shutty | F02D 41/0072 60/605.2 |
| 2007/0220864 | A1 | 9/2007 | Haugen | |
| 2008/0276602 | A1* | 11/2008 | McCabe | F01N 3/0821 60/295 |
| 2009/0132153 | A1* | 5/2009 | Shutty | F01N 11/002 701/108 |
| 2009/0205323 | A1* | 8/2009 | Tsujimoto | B01D 53/9431 60/286 |
| 2009/0266060 | A1* | 10/2009 | Guo | F02D 41/029 60/295 |
| 2010/0275581 | A1* | 11/2010 | Wada | B01D 53/9409 60/276 |
| 2010/0293923 | A1* | 11/2010 | Yokoi | F02D 41/029 60/273 |
| 2011/0209459 | A1* | 9/2011 | Hancu | F01N 3/025 60/274 |
| 2011/0270511 | A1* | 11/2011 | Kurtz | F02D 28/00 701/105 |
| 2012/0023906 | A1* | 2/2012 | Yezerets | F01N 3/208 60/274 |
| 2012/0059572 | A1* | 3/2012 | Larsson | F02D 41/0055 701/112 |
| 2012/0078491 | A1* | 3/2012 | Erlandsson | F02B 1/02 701/104 |
| 2013/0209337 | A1* | 8/2013 | Cooper | B01D 53/9422 423/213.5 |
| 2014/0013727 | A1* | 1/2014 | Schneider | F01N 3/035 60/274 |
| 2014/0123630 | A1 | 5/2014 | Eckhoff et al. | |
| 2015/0377188 | A1* | 12/2015 | Gingrich | F02B 61/00 60/278 |
| 2016/0108788 | A1* | 4/2016 | Nam | F01N 3/2053 60/273 |
| 2016/0108830 | A1* | 4/2016 | Jang | F02D 41/0002 701/22 |

FOREIGN PATENT DOCUMENTS

| DE | 10023060 A1 | 1/2002 |
|---|---|---|
| DE | 102008015600 A1 | 10/2009 |
| DE | 102008048854 A1 | 4/2010 |
| DE | 112008003421 T5 | 10/2010 |
| DE | 102010063872 A1 | 7/2011 |
| DE | 102011101079 A1 | 11/2012 |
| DE | 102011107692 B3 | 1/2013 |
| DE | 102013111110 A1 | 4/2014 |
| DE | 102013200536 B3 | 5/2014 |
| DE | 102014202495 A1 | 9/2014 |
| DE | 102014201000 A1 | 7/2015 |
| DE | 102015208093 A1 | 11/2015 |
| EP | 1936140 A1 | 6/2008 |

\* cited by examiner

METHODS RELATING TO EXHAUST AFTER-TREATMENT DEVICES

CROSS REFERENCE TO RELATED APPLICATIONS

The present application claims priority to German Patent Application Nos. 102015202899.2, 102015202904.2, 102015202898.4, 102015202893.3, 102015202885.2, 102015202903.4, 102015202897.6, 102015202896.8, 102015202892.5, and 102015202887.9, all filed on Feb. 18, 2015, the entire contents of each of which are hereby incorporated by reference for all purposes.

FIELD

The present description relates generally to system and methods for exhaust after-treatment devices.

BACKGROUND/SUMMARY

In the prior art, it is known for example from DE 102013111110 A1 that engines with exhaust-gas recirculation systems can be configured to divert at least a part of the exhaust gas from an engine outlet passage to an engine intake passage. Engine pumping work and NOx emissions can be reduced by means of exhaust-gas recirculation (EGR). For example, for the same engine load, the throttle may be controlled to open to a greater extent during exhaust gas recirculation than the extent to which the throttle may be controlled open when exhaust gas recirculation is not occurring. Pumping losses can be reduced by reducing the throttling of the engine, which improves the fuel efficiency. Furthermore, with exhaust-gas recirculation, the combustion temperature can be reduced, which reduces an amount of NOx generated during the combustion.

The present disclosure is based on the object of making it possible for parameters for an exhaust-gas after-treatment device to be influenced more easily, and thus for the exhaust-gas after-treatment device to be controlled more effectively.

In one example, a motor vehicle having a hybrid drivetrain comprises an electric machine and an internal combustion engine, an intake-air tract, an exhaust tract, an exhaust-gas after-treatment device which is arranged in the exhaust tract, and an exhaust-gas recirculation tract which is designed to conduct exhaust gas out of the exhaust tract from an exhaust-gas extraction point, arranged downstream of the exhaust-gas after-treatment device, to an exhaust-gas introduction point, arranged in the intake-air tract, as a result of which a loop is formed. In order to check whether a corrective measure should be taken to ensure effective functioning of the exhaust-gas after-treatment device, at least one value which characterizes a current state of an exhaust-gas after-treatment device is compared with a setpoint value of the exhaust-gas after-treatment device. If, in the event of a deviation of the value which characterizes the current state of the exhaust-gas after-treatment device from the setpoint value, a demand for a measure (such as a corrective measure) is detected, and the measure is implemented in a measure implementation step. The measure here comprises supplying an intake charge (alternately referred to herein as "charge gas"), which has recirculated exhaust gas, to the internal combustion engine during overrun operation. In particular, charge gas which is formed entirely from recirculated exhaust gas is fed to the engine.

The exhaust-gas after-treatment actual value is detected in an exhaust-gas after-treatment value detection step. The exhaust-gas after-treatment actual value can be based on at least one measured value or else on a result of a mathematical model. The measure is, in particular, a measure for reducing nitrogen oxides (NOx).

The operating conditions of the at least one exhaust-gas after-treatment device are advantageously influenced by means of the operating method. The desired influencing is implemented here either directly during the operating method in the overrun operation, or immediately after the internal combustion engine has returned from overrun operation. During overrun conditions the internal combustion engine may not provide torque for operating the vehicle and the throttle may be maintained in closed position. The exhaust-gas after-treatment device is kept within predefined parameters or is adjusted to said parameters in which the exhaust-gas after-treatment device functions optimally. As a result, the effectiveness of the exhaust-gas after-treatment device is increased and undesired emissions are reduced.

In particular, the temperature of the exhaust-gas after-treatment device is influenced by means of the flushing of the exhaust-gas after-treatment device with recirculated exhaust gas during overrun operation of the internal combustion engine. In addition to the exhaust gas recirculation, the measure can comprise introducing fuel into the loop (that is to say into the internal combustion engine or into the exhaust tract).

The exhaust-gas composition can advantageously be influenced by introducing the fuel during the measure. Richer exhaust gas can be generated. In the exhaust-gas after-treatment device, configured as a nitrogen oxide storage catalytic converter, the richer exhaust gas can bring about a release of the stored nitrogen oxides which can then be converted in a second exhaust-gas after-treatment device, embodied as a selectively active reduction catalytic converter. Here, the fuel may be introduced, in particular in a post-injection, into a combustion chamber of the internal combustion engine or into the exhaust tract, in particular upstream of the exhaust-gas after-treatment device. Also, reduction of trapped nitrogen oxides (NOx) can be brought about by additionally feeding in urea solution (urea), which reacts in the exhaust gas to form ammonia ($NH_3$). Instead of the urea solution, it is also possible for some other substance to be introduced which makes a reducing agent available in the SCR catalytic converter or is itself a reducing agent, in particular ammonia.

In one advantageous embodiment of the operating method according to the disclosure, the measure comprises operating the electric machine. The electric machine can be operated in such a way that the electric machine drives the motor vehicle, or else in such a way that the internal combustion engine reaches or maintains a specific rotational speed. In particular, the internal combustion engine may be kept constant at a predefined rotational speed during the measure.

In this way, the hybrid drivetrain is used to decouple the internal combustion engine from the drive during the measure. The internal combustion engine can, as a result, be used solely for influencing the exhaust-gas after-treatment devices arranged in the loop. The internal combustion engine can stay in the overrun operation by virtue of the motor vehicle being driven by means of the electric machine. The phases of the overrun operation of the internal combustion engine can therefore be extended. The operating state of the internal combustion engine becomes less dependent on the driving state of the motor vehicle. By driving the internal combustion engine by means of the electric machine, the internal combustion engine can, in overrun operation, reach any desired rotational speed which is independent of the current motor vehicle speed. The mass flow through the internal combustion engine can as a result be optimized for the measure, and the measure can be carried out more effectively. Moreover, a constant rotational speed of the internal combustion engine makes the measure easier to control.

In the demand check, consideration is given, in particular, to ammonia loading in the exhaust-gas after-treatment device, embodied as a selectively active reduction catalytic converter. The measure is carried out if the detected exhaust-gas after-treatment actual value for the ammonia loading falls below the exhaust-gas after-treatment setpoint value for the ammonia loading.

This advantageously ensures that a predefined quantity of ammonia, which is available for the reduction of the nitrogen oxides, is stored in the exhaust-gas after-treatment device, embodied as a selectively active reduction catalytic converter. The measure can be carried out as a function of the ammonia which is already present.

As an alternative to or in addition, in the demand check, consideration is given to a nitrogen oxide load in the exhaust-gas after-treatment device, embodied as a nitrogen oxide storage catalytic converter. The measure is carried out if the detected exhaust-gas after-treatment actual value for the nitrogen oxide load exceeds the exhaust-gas after-treatment setpoint value for the nitrogen oxide load.

This advantageously ensures that, when there is a predefined quantity of nitrogen oxides which are stored in the exhaust-gas after-treatment device, embodied as a nitrogen oxide storage catalytic converter, a measure for reducing them may be carried out. The exhaust-gas after-treatment device is therefore operated within the limits of its capacity. The measure can be carried out as a function of the capacity utilization of the exhaust-gas after-treatment device.

As an alternative to or in addition, in the demand check, consideration is given to a nitrogen oxide content upstream of the exhaust-gas after-treatment device, embodied as selectively active reduction catalytic converter. The measure is carried out if the detected exhaust-gas after-treatment actual value for the nitrogen oxide content exceeds the exhaust-gas after-treatment setpoint value for the nitrogen oxide content.

As a result it is detected if a nitrogen oxide storage catalytic converter arranged upstream of the selectively active reduction catalytic converter no longer absorbs nitrogen oxides to a desired amount. The measure can also be carried out here as a function of the capacity utilization of the exhaust-gas after-treatment device.

The demand check in the operating method takes place in such a way that not only a deviation of the exhaust-gas after-treatment actual value from the exhaust-gas after-treatment setpoint value is determined, but also the difference that is currently present between the exhaust-gas after-treatment actual value and the exhaust-gas after-treatment setpoint value is also determined. An extent of the required measure can be determined therefrom. The demand check is therefore carried out at the beginning of the operating method, at the moment when the exhaust-gas recirculation valves open. In particular, a time period for the measure to be carried out can be determined. As a result, the performance of the measure can be adjusted as a function of the extent of deviation of the current after-treatment value from the setpoint value.

In a further embodiment of the operating method according to the disclosure, in a motor vehicle value detection step, at least one motor vehicle actual value, which characterizes a current motor vehicle actual state, is detected, and in a capability check, said motor vehicle actual value is compared with at least one motor vehicle setpoint value, and the measure is implemented under the condition that the capability of the motor vehicle to implement the measure is identified if the motor vehicle actual value corresponds to the motor vehicle setpoint value. In the capability check, in particular, consideration is given to a hybrid drivetrain value or a motor vehicle speed or an engine speed or a motor vehicle load or a fuel injection quantity or a brake pedal position or an accelerator pedal position or a clutch pedal position or an item of navigation information or an item of traffic information or an item of cruise control system information.

As a result, consideration is also given to the current state of the motor vehicle, and it can be determined whether it is at all possible for the desired conditions to be brought about, or whether it is likely that said desired conditions will be brought about, in said current state.

The motor vehicle according to another example of the disclosure comprises a hybrid drivetrain having an electric machine and an internal combustion engine, an intake-air tract, an exhaust tract, an exhaust-gas after-treatment device arranged in the exhaust tract, and an exhaust-gas recirculation tract which is designed for conducting exhaust gas out of the exhaust tract from an exhaust-gas extraction point arranged downstream of the exhaust-gas after-treatment device to an exhaust-gas introduction point arranged in the intake-air tract, as a result of which a loop is formed. The motor vehicle has at least one valve, an exhaust-gas after-treatment value detection unit for detecting an exhaust-gas after-treatment actual value, and a control unit which is designed to identify overrun operation of the internal combustion engine and to adjust the at least one valve during overrun operation in such a way that charge gas, which has recirculated exhaust gas, can be fed to the internal combustion engine, and which is designed to control the electric machine.

The motor vehicle has, in particular, a first exhaust-gas after-treatment device arranged in the exhaust tract, and a second exhaust-gas after-treatment device arranged downstream of the first exhaust-gas after-treatment device and upstream of the exhaust-gas extraction point. The first exhaust-gas after-treatment device is, in particular, a nitrogen oxide storage catalytic converter, and the second exhaust-gas after-treatment device is, in particular, a selectively active reduction catalytic converter which can be a Selective Catalytic Reduction (SCR) catalytic converter (or a particle filter with SCR coating (SCRF for SCR on filter). Both low-pressure and high-pressure EGR may be provided. The hybrid drivetrain can be a parallel or serial hybrid drivetrain.

A motor vehicle with a hybrid drivetrain is therefore provided which makes it possible to perform exhaust-gas recirculation during overrun operation of the internal combustion engine. This therefore makes it possible to influence the operating parameters of the exhaust-gas after-treatment devices arranged in the loop. The hybrid drivetrain also makes it possible to decouple the internal combustion engine from the driving operation (providing torque), at least for a specific time period, and to use said internal combustion engine solely for the measure of influencing the exhaust-gas after-treatment device.

In one embodiment, the motor vehicle has a fuel injector which is designed to introduce fuel into the loop, the control unit being designed to control the fuel injector. The fuel injector is designed, in particular, to introduce the fuel into a combustion chamber of the internal combustion engine or into the exhaust tract.

It is therefore made possible for the exhaust-gas recirculation to be combined with an injection of fuel, and for the composition of the exhaust-gas flow to be influenced even during overrun operation of the internal combustion engine. Increasing the proportion of fuel makes it possible to generate richer exhaust gas, which is advantageous, for example, for regenerating the nitrogen oxide storage catalytic converter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
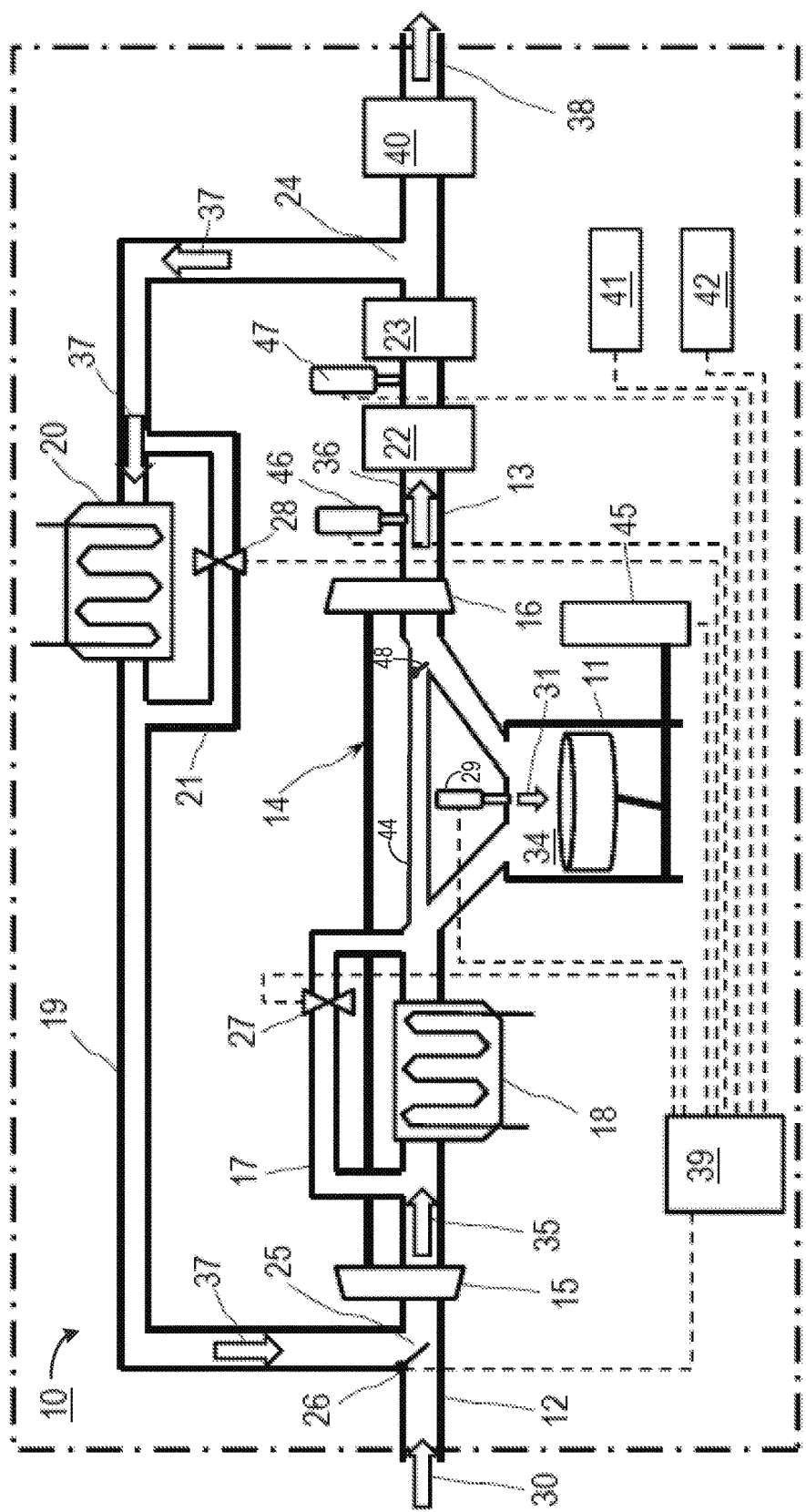
FIG. 1 shows a first example embodiment of a motor vehicle according to the disclosure.

FIGS. 1 to 4 illustrate the motor vehicle 10 according to the disclosure in exemplary embodiments. The motor vehicle 10 has a hybrid drivetrain with an electric machine 45 and an internal combustion engine 11. The electric machine 45 and the internal combustion engine 11 can be coupled in parallel or in series to one another here. The internal combustion engine 11 is in particular a reciprocating piston engine. The internal combustion engine 11 may comprise multiple cylinders (with combustion chambers such as combustion chamber 34). At least one of the cylinders in the internal combustion engine 11 may be a switchable cylinder which may be selectively deactivated during overrun conditions. The motor vehicle 10 is equipped with an intake-air tract 12, which is designed to conduct charge gas 35 to the internal combustion engine 11, and an exhaust tract 13, which is designed to conduct exhaust gas 36 away from the internal combustion engine 11.

The motor vehicle 10 comprises a low-pressure exhaust-gas recirculation (LP-EGR) tract 19 and a high-pressure EGR (HP-EGR) tract 44 to implement exhaust-gas recirculation. In one example, the EGR delivered may be a LP-EGR, wherein a portion of exhaust gas from the exhaust tract 13 may be delivered via LP-EGR tract 19 from downstream of a turbocharger turbine 16 to the engine intake manifold, upstream of a turbocharger compressor 15. In another example, the EGR delivered may be a HP-EGR, wherein a portion of exhaust gas from the exhaust tract 13 may be delivered via HP-EGR tract 44 from upstream of a turbocharger turbine 16 to the engine intake manifold, downstream of a turbocharger compressor 15.

The LP-EGR tract 19 is coupled to the exhaust tract 13 at an exhaust-gas extraction point 24 and to the intake-air tract 12 at an exhaust-gas introduction point 25. With the LP-EGR tract 19, a loop is formed which leads from the exhaust-gas extraction point 24 in the exhaust tract 13, via the LP-EGR tract 19, to the exhaust-gas introduction point 25 in the intake-air tract 12, and via the internal combustion engine 11 back to the exhaust-gas extraction point 24. The LP-EGR tract 19 is designed to conduct at least a portion of the exhaust gas 36 flowing through the exhaust tract 13 to the intake-air tract 12. The exhaust gas conducted from the exhaust tract to the intake-air tract via the LP-EGR track is in this case referred to as recirculated exhaust gas 37. The remaining portion is in this case referred to as discharged exhaust gas 38.

The motor vehicle 10 is designed such that the entire mass flow of the exhaust gas 36 can be recirculated to the intake-air tract 12 through the LP-EGR tract 19 and HP-EGR tract 44. Here, the mass flow of the exhaust gas 36 is equal to the mass flow of the recirculated exhaust gas 37. Here, the exhaust gas 36 circulates in the loop. This situation is illustrated with reference to FIGS. 2 to 4.

The charge gas 35 can be generated in principle from fresh air 30 and recirculated exhaust gas 37 in various ratios during exhaust-gas recirculation, as shown in FIG. 1. The motor vehicle 10 is designed to form 100% of the charge gas 35 from recirculated exhaust gas 37. Here, the mass flow of the charge gas 35 is equal to the mass flow of the recirculated exhaust gas 37. Here, the mass flow of the fresh air 30 is zero. The motor vehicle 10 is illustrated in this state in FIGS. 2 to 4.

Figure 3:
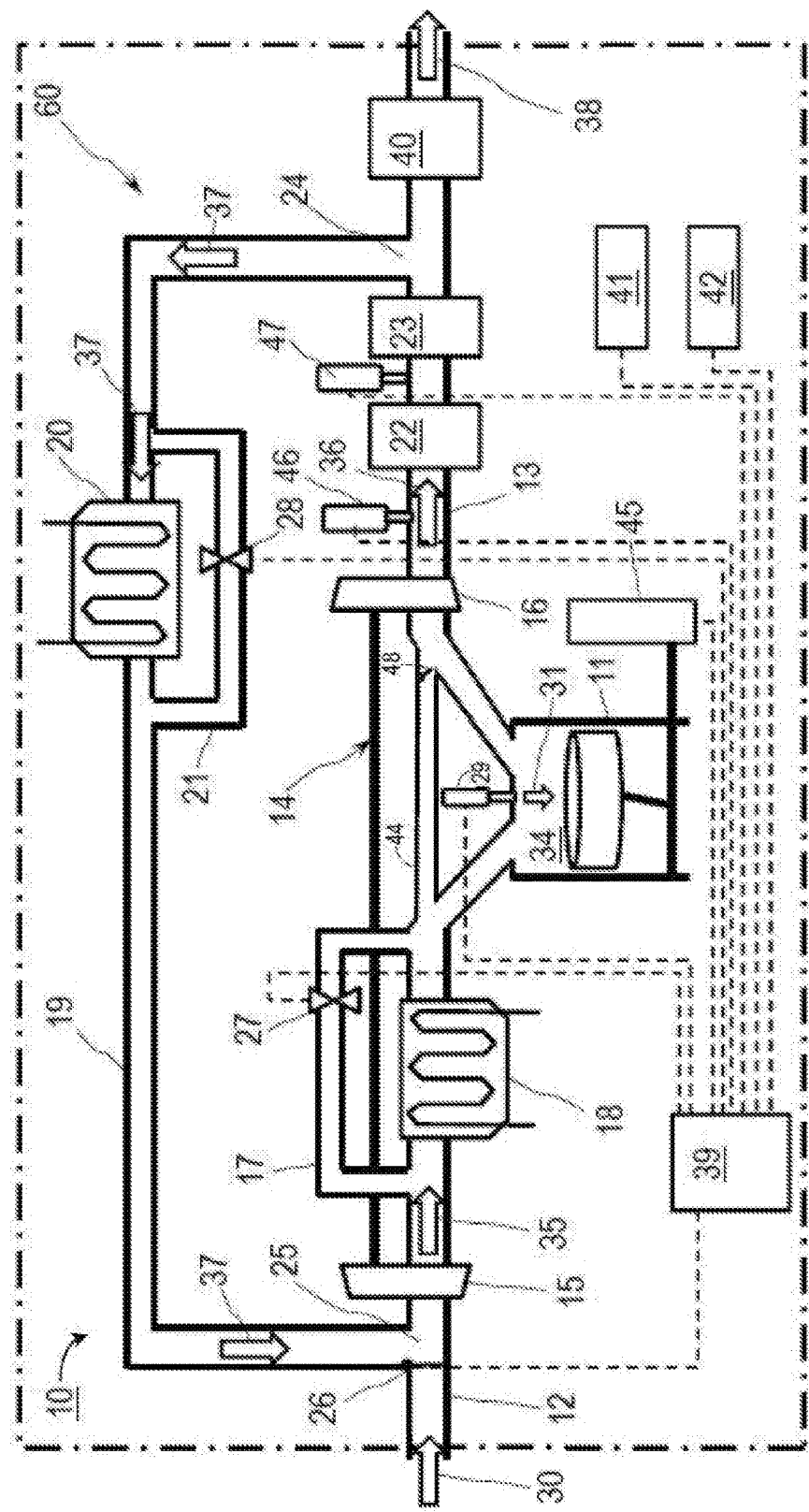
FIG. 3 shows a second example operation carried out by the first embodiment of the motor vehicle.
Figure 4:
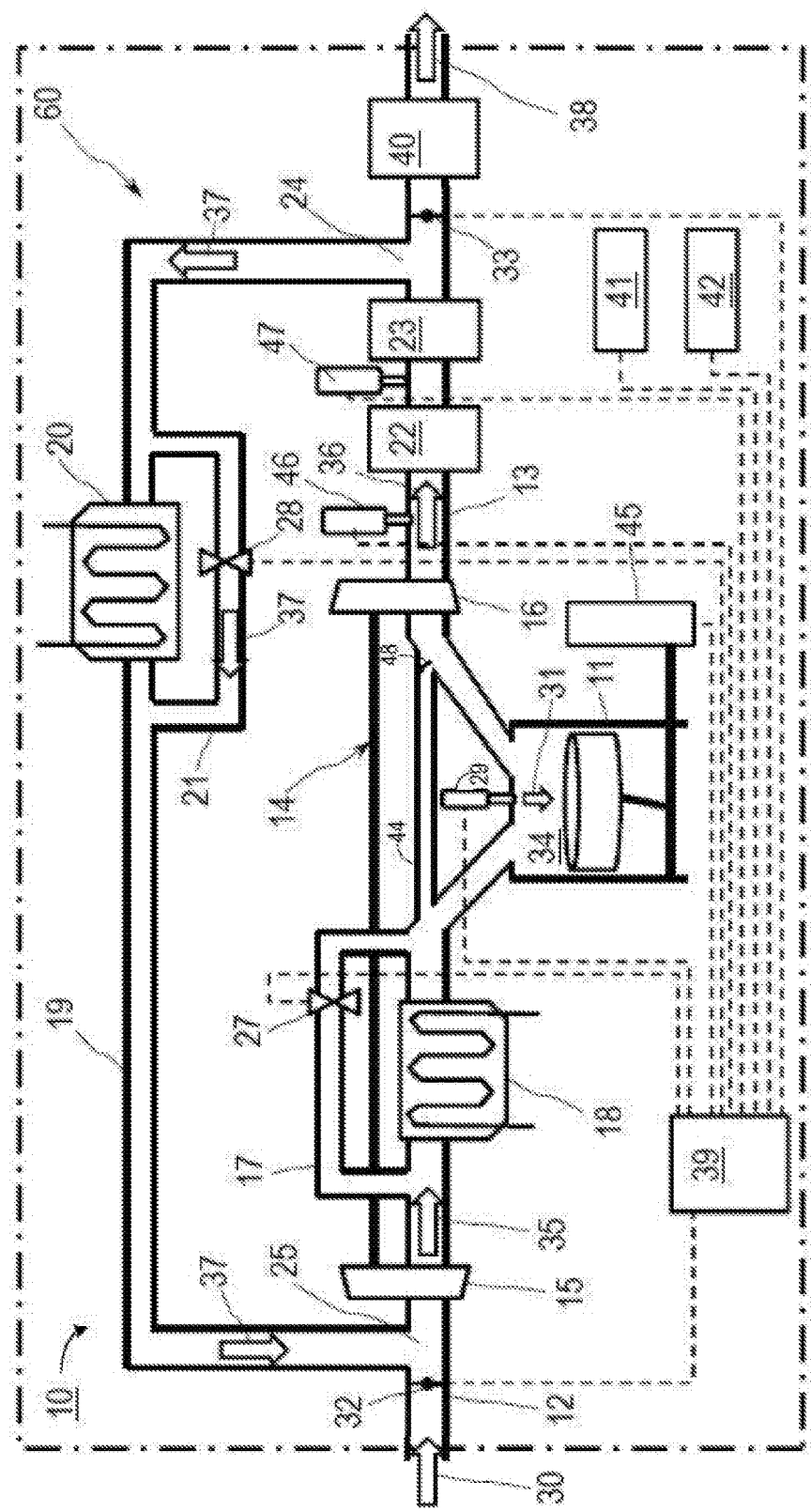
FIG. 4 shows a third example operation carried out by a second example embodiment of the motor vehicle.

To adjust the ratio of fresh air 30 and recirculated exhaust gas 37 in the charge gas 35, the motor vehicle 10 may have a plurality of valves 26, 32, 33, 48. In the variant illustrated in FIGS. 1 to 3 (first embodiment), the motor vehicle 10 has a combination valve 26 in the intake-air tract 12. FIG. 4 illustrates an alternative second embodiment in which the motor vehicle 10 has an inlet throttle flap 32 in the intake-air tract 12 and an outlet throttle flap 33 in the exhaust tract 13. In the first and second embodiment the motor vehicle 10 has a valve 44 controlling the flow of HP-EGR.

The combination valve 26 is arranged in the intake-air tract 12 at the exhaust-gas introduction point 25. The combination valve 26 is designed both to open to varying degrees or shut off the LP-EGR tract 19 for a through flow of recirculated exhaust gas 37 and to open to varying degrees or shut off the intake-air tract 12 for an inflow of fresh air 30. The mass flow portions of the fresh air 30 and of the recirculated exhaust gas 37 in the mass flow of the charge gas 35 can be varied as a function of the position of the combination valve 26.

The inlet throttle flap 32 is arranged in the intake-air tract 12 upstream of the exhaust-gas introduction point 25. The inlet throttle flap 32 is designed to open to varying degrees or shut off the intake-air tract 12 for an inflow of fresh air 30. The mass flow of the fresh air 30 can be varied as a function of the position of the inlet throttle flap 32.

The outlet throttle flap 33 is arranged in the exhaust tract 13 downstream of the exhaust-gas extraction point 24 (as seen in FIG. 4). The outlet throttle flap 33 is designed to open to varying degrees or shut off the exhaust tract 13 for an outflow of discharged exhaust gas 38. The mass flow of the discharged exhaust gas 38 can be varied as a function of the position of the outlet throttle flap 33.

The motor vehicle 10 has at least one exhaust-gas aftertreatment device 22, 23, 40. The illustrated embodiments of the motor vehicle 10 comprise a first exhaust-gas aftertreatment device 22 and a second exhaust-gas after-treatment device 23 arranged downstream of the first exhaust-gas after-treatment device 22. These two exhaust-gas after-treatment devices 22, 23 are positioned within the loop, upstream of the exhaust-gas extraction point 24 in the exhaust tract 13. In one example, the first exhaust-gas after-treatment device 22 is a nitrogen oxide storage catalytic converter (also referred to as a nitrogen trap or LNT for lean NOx Trap) or an oxidation catalytic converter. In another example, the first exhaust-gas after-treatment device 22 is a sulfur oxide trap. The second exhaust-gas after-treatment device 23 can be a selectively active reduction catalytic converter which can be embodied as an SCR catalytic converter or as a particle filter with SCR coating (SDPF). In addition to the first exhaust-gas after-treatment device 22 and to the second exhaust-gas after-treatment device 23, further exhaust-gas after-treatment devices can be arranged in the exhaust tract 13. For instance, the embodiments shown have a third exhaust-gas after-treatment device 40 which is arranged downstream of the exhaust-gas extraction point 24 in the exhaust tract 13, outside the loop.

In the embodiments shown, the motor vehicle 10 is also equipped with a turbocharger 14. The latter comprises a compressor 15 which is arranged in the intake-air tract 12 and which, as is known, can be driven by an exhaust-gas turbine 16 arranged in the exhaust tract 13. Here, the exhaust-gas turbine 16 is arranged upstream of the exhaust-gas extraction point 24 and upstream of the first exhaust-gas after-treatment device 22.

Figure 2:
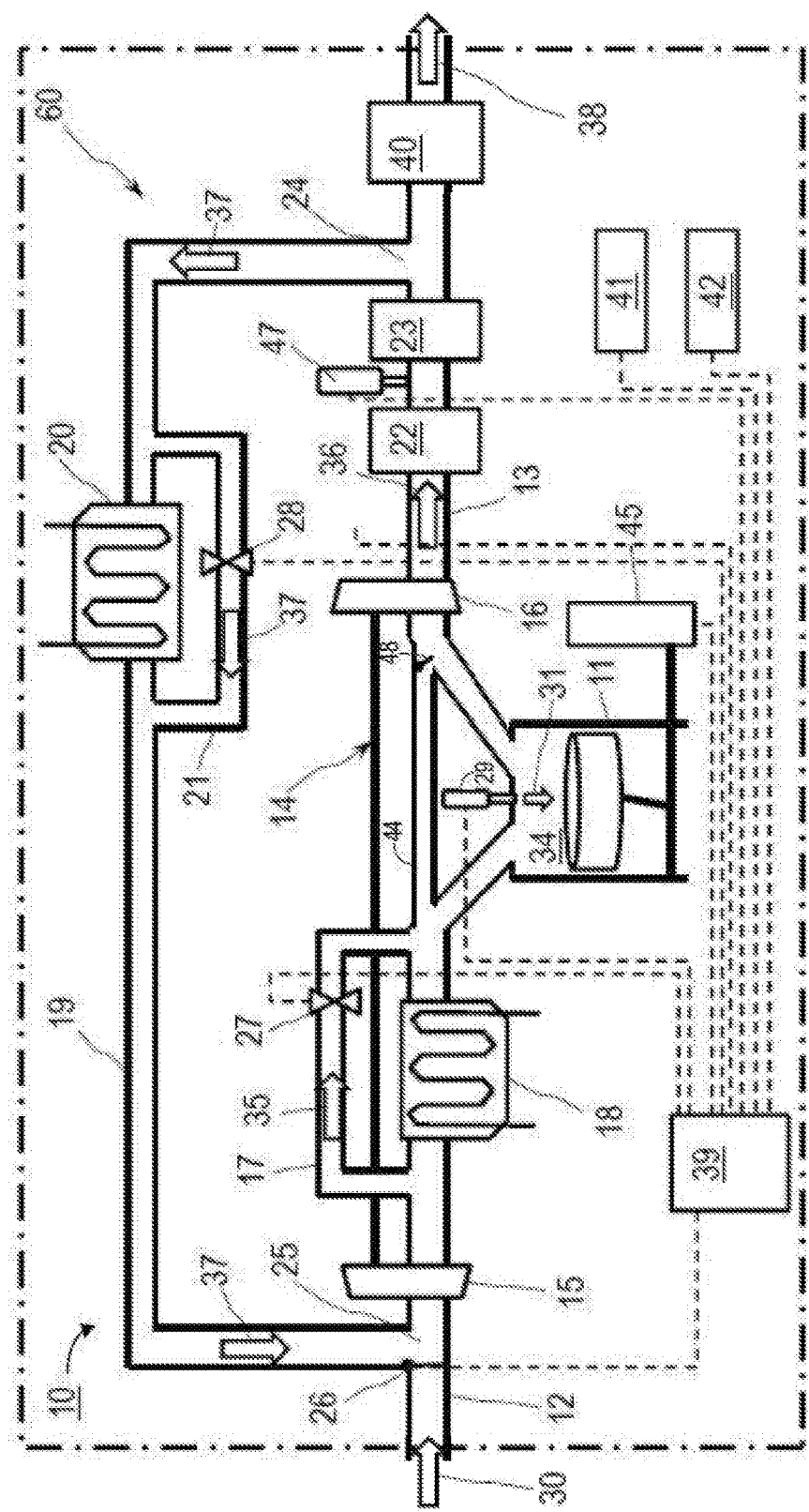
FIG. 2 shows a first example operation carried out by the first embodiment of the motor vehicle.

The motor vehicle 10 comprises a charge-air cooler 18 for cooling the charge gas 35. The charge-air cooler 18 is arranged in the intake-air tract 12 downstream of the compressor 15 and upstream of the internal combustion engine 11. Furthermore, the motor vehicle 10 may comprise a charge-air cooler bypass 17 for conducting the charge gas 35 past the charge-air cooler 18. The charge-air cooler bypass 17 is arranged in parallel with the charge-air cooler 18, with a branching point upstream of the charge-air cooler 18 and an entry point downstream of the charge-air cooler 18. In particular, a charge-air cooler bypass valve 27 is provided in the charge-air cooler bypass 17 to control the mass flow of the charge gas 35 through the charge-air cooler bypass 17. The charge-air cooler bypass valve 27 is designed to open to varying degrees and shut off the charge-air cooler bypass 17 for a throughflow of charge gas 35. The charge-air cooler bypass valve 27 may also be in the form of a switchover valve and arranged downstream or upstream of the charge-air cooler 18. FIG. 2 illustrates a mass flow of the charge gas 35 through the charge-air cooler bypass 17.

The motor vehicle 10 may additionally have an exhaust-gas cooler 20 for cooling the exhaust gas 36, in particular for cooling the recirculated exhaust gas 37. The exhaust-gas cooler 20 is in particular arranged in the LP-EGR tract 19. Furthermore, the motor vehicle 10 may comprise an exhaust-gas cooler bypass 21 which is designed to conduct the recirculated exhaust gas 37 past the exhaust-gas cooler 20. The exhaust-gas cooler bypass 21 is arranged in parallel with the exhaust-gas cooler 20, with a branching point upstream of the exhaust-gas cooler 20 and an entry point downstream of the exhaust-gas cooler 20. In particular, to control the mass flow of the recirculated exhaust gas 37 through the exhaust-gas cooler bypass 21, an exhaust-gas cooler bypass valve 28 is provided in the exhaust-gas cooler bypass 21. The exhaust-gas cooler bypass valve 28 is designed to open to varying degrees or shut off the exhaust-gas cooler bypass 21 for a throughflow of recirculated exhaust gas 37. The exhaust-gas cooler bypass valve 28 may also be in the form of a switchover valve and arranged downstream or upstream of the exhaust-gas cooler 20. FIGS. 2 and 4 illustrate a mass flow of the recirculated exhaust gas 37 through the exhaust-gas cooler bypass 21.

The internal combustion engine 11 of the motor vehicle 10 has a direct injection system. For this purpose, the internal combustion engine 11 may have a first fuel injector 29 which is designed to inject fuel 31 into a combustion chamber 34 of the internal combustion engine 11. Alternatively or in addition, the motor vehicle 10 may have a second fuel injector 46 which is designed to introduce fuel into the exhaust tract 13. The at least one fuel injector 29, 46 is therefore designed to introduce fuel 31 into the loop.

Furthermore, the motor vehicle may comprise a urea solution injector 47 which is designed to introduce urea solution (urea) into the loop, in particular into the exhaust tract 13. The urea solution reacts in the exhaust gas to form ammonia (NH3). The urea solution injector 47 is arranged, in particular, upstream of the second exhaust-gas after-treatment device 23, embodied as a selectively active reduction catalytic converter. The urea solution injector 47 may likewise be designed also to introduce, instead of the urea solution, some other substance which makes a reducing agent available in the SCR catalytic converter or is itself a reducing agent, in particular ammonia.

According to the disclosure, the motor vehicle 10 comprises an exhaust-gas after-treatment value detection unit 41 which is designed to detect at least one current exhaust-gas after-treatment actual value (denoted by A). Here, the detection can be carried out by measurement and/or calculation. The exhaust-gas after-treatment value detection unit 41 comprises one or more of an ammonia sensor, a nitrogen oxide sensor, a sulfur oxide sensor and an oxygen sensor. The exhaust-gas after-treatment actual value A is, may be at least one of a value for an ammonia charge in the second exhaust-gas after-treatment device 23, embodied as a selectively active reduction catalytic converter, a nitrogen oxide load in the first exhaust-gas after-treatment device 22, embodied as a nitrogen oxide storage catalytic converter, a sulfur oxide load in the first exhaust-gas after-treatment device 22 embodied as a sulfur oxide trap and a nitrogen oxide content in the exhaust gas 36, in particular downstream of the nitrogen oxide storage catalytic converter. In addition, the exhaust-gas after-treatment actual value A can be a temperature of one of the exhaust-gas after-treatment devices 22, 23, 40 and/or of the exhaust gas 36. An oxygen content of the exhaust gas 36 can also form the exhaust-gas after-treatment actual value A.

The motor vehicle 10 shown comprises a motor vehicle value detection unit 42 which is designed to detect at least one current motor vehicle actual value (denoted by C). The detection can be carried out here by measurement and/or calculation. The motor-vehicle actual value C is, in particular, a value of the hybrid drive train. In addition, the motor vehicle actual value C may be a value of the variables of the motor vehicle speed, or engine speed, or motor vehicle load, or fuel injection quantity, or brake pedal position or accelerator pedal position or clutch pedal position, or else an item of navigation information, or an item of traffic information, or an item of cruise control system information.

The exhaust-gas after-treatment value detection unit 41 and the motor vehicle value detection unit 42 may be integrated into other systems of the motor vehicle 10, and may comprise sensors in the hybrid drivetrain or in the exhaust tract 13.

Furthermore, the motor vehicle 10 comprises a control unit 39, which is an engine control device. The control unit 39 is designed to control the hybrid drivetrain, to adjust a plurality of valves (such as 26, 27, 28, 32, 33) and to actuate the fuel injectors 29 and 46 and the urea solution injector 47. The motor vehicle 10 has suitable actuators for this purpose. Furthermore, the control unit 39 is designed to identify overrun operation of the internal combustion engine 11. For this purpose, the control unit 39 is connected to the motor vehicle value detection unit 42. The internal combustion engine 11 is in the overrun operation if, during operation, it does not make any torque available for driving the motor vehicle 10. The control unit 39 is designed to detect a current actual state of the motor vehicle 10. In addition, the control unit 39 is connected to the exhaust-gas after-treatment value detection unit 41 and is designed to detect a current actual state of at least one of the exhaust-gas after-treatment devices 22, 23, 40.

Figure 5:
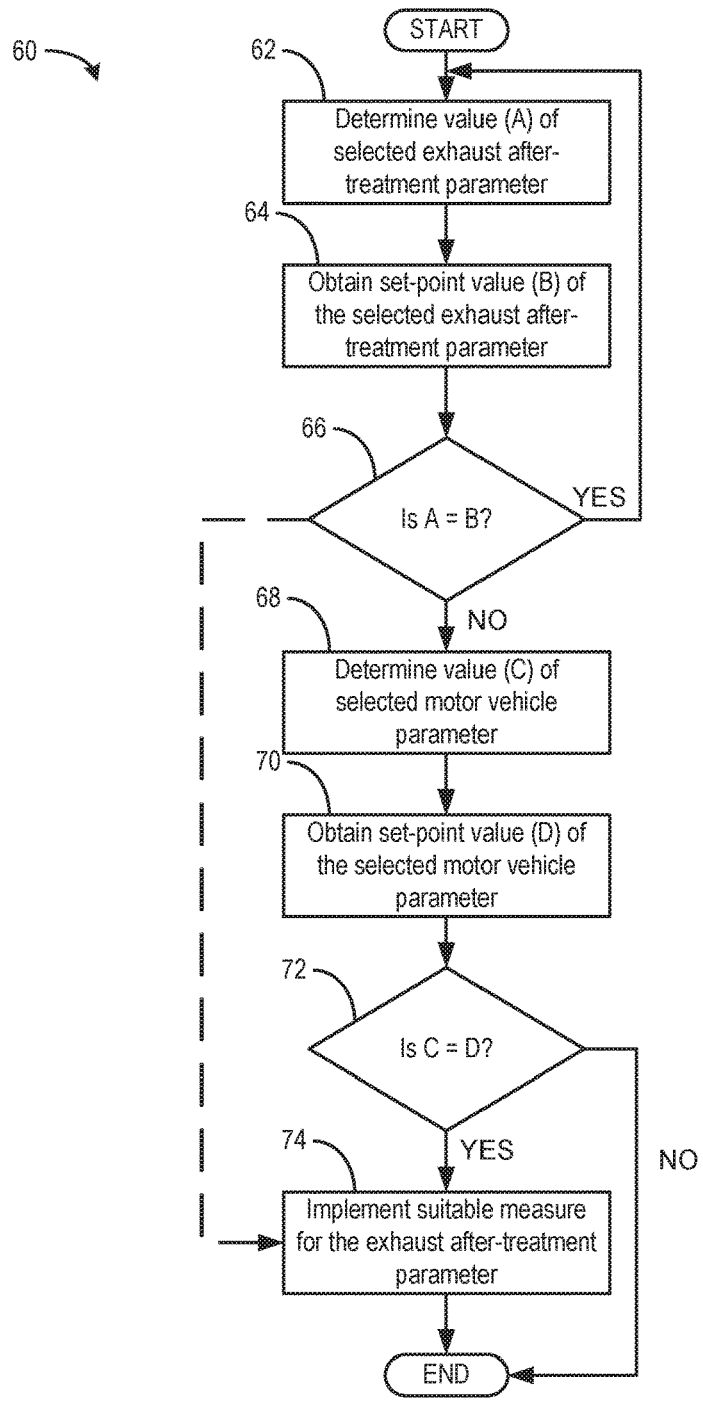
FIG. 5 shows a flowchart illustrating an example method for operating the first embodiment of the motor vehicle.

The motor vehicle 10 is designed for carrying out the operating method 60 according to the disclosure. FIGS. 2 to 4 illustrate how the motor vehicle 10 executes the operating method 60 in various implementations. FIG. 5 illustrates the operating method 60 according to the disclosure in an exemplary implementation in a flow diagram. Instructions for carrying out method 60 may be executed by a control unit 39 of the engine based on instructions stored in a memory of the controller and in conjunction with signals received from sensors of the engine system and signals sent to actuators to adjust engine operation as described herein, such as valve deactivation mechanisms, the spark plug ignition coil actuators, etc.

FIGS. 1-4 shows example configurations of an internal combustion with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

In the operating method 60 according to the disclosure, a corrective measure is implemented. The measure influences the temperature of the exhaust-gas after-treatment devices 22, 23 arranged in the loop, and the exhaust gas composition. The measure comprises charge gas 35, which has recirculated exhaust gas 37, being supplied to the internal combustion engine 11 during overrun operation of the internal combustion engine 11. For this purpose, the feeding in of fresh air 30 is throttled, in particular to zero, and the LP-EGR tract 19 is opened. Charge gas formed exclusively from recirculated exhaust gas 37 is made available to the internal combustion engine 11. In addition to LP-EGR, HP-EGR may also be supplied directly to the intake manifold. This is illustrated in FIGS. 2 to 4. In FIGS. 2 and 3, the combination valve 26 is adjusted such that the mass flow of fresh air 30 is zero. At the same time, the LP-EGR tract 19 is opened. In FIG. 4, the mass flow of the fresh air 30 is set to zero by virtue of the inlet throttle flap 32 being closed. To simultaneously bring about the exhaust-gas recirculation, the outlet throttle flap 33 is also closed.

The exhaust-gas after-treatment devices 22, 23, 40 are induced to perform a desired function by means of the operating method 60 according to the disclosure. Different states are aimed for by means of the measure, depending on the type of exhaust-gas after-treatment device 22, 23, 40. For example, an operating temperature of approximately 180° C. can be realized or maintained for the second exhaust-gas after-treatment device 23, embodied as a selectively active reduction catalytic converter. If the second exhaust-gas after-treatment device 23 is a particle filter (DPF), it is for example possible for a regeneration temperature of 600° C. to be realized or maintained in order to bring about regeneration of the particle filter. If the first exhaust-gas after-treatment device 22 is a nitrogen oxide storage catalytic converter (LNT), it is possible, for example, for an operating temperature of >200° C. to be realized or maintained. In addition, fuel 31 and/or urea may be introduced in order to ensure the desired functionality. During cold-start conditions, a measure may be carried out to ensure that the exhaust-gas after-treatment device 22 reaches its light-off temperature within a short time.

During the operating method 60 according to the disclosure, a specific quantity of ammonia can be introduced, by injecting urea solution, into the loop, within the scope of the measure. This may be realized either by means of a single injection process or by means of a plurality of injection processes. The introduced ammonia can react with the nitrogen oxides in the exhaust gas 36; and reduction of the nitrogen oxides is carried out.

In addition, a predefined quantity of fuel 31 can be introduced into the loop within the scope of the measure. This may also be realized either by means of a single injection process or by means of multiple injection processes. FIGS. 2 to 4 illustrate an injection into the combustion chamber 34. Instead of the injection into the combustion chamber 34 or in addition to the injection into the combustion chamber 34, an injection of fuel 31 into the exhaust tract 13 may also be performed. Rich exhaust gas 36 is generated by means of the injection of fuel 31. The rich exhaust gas 36 is used to flush the exhaust-gas after-treatment devices 22, 23 arranged within the loop. The first exhaust-gas after-treatment device 22, embodied as nitrogen oxide storage catalytic converter, can be induced by an excess supply of fuel 31 to produce a specific quantity of ammonia (NH3), for example. These NH3 molecules can be used to assist conversion of the nitrogen oxides in the second exhaust-gas after-treatment device 23, embodied as a selectively active reduction catalytic converter.

In the implementation of the operating method 60 illustrated in FIG. 5, an exhaust-gas after-treatment value detection step 62 is performed after the start. In this case, the actual value (A) of at least one exhaust-gas after-treatment parameter is detected. The exhaust-gas after-treatment actual value A is detected here by the exhaust-gas after-treatment value detection unit (such as unit 41). The exhaust-gas after-treatment actual value A characterizes a current actual state of the motor vehicle 10. In one example, the exhaust-gas after-treatment actual value A may be a value for the ammonia loading in the second exhaust-gas after-treatment device 23, embodied as a selectively active reduction catalytic converter, that is to say can specify how much ammonia is presently stored in the selectively active reduction catalytic converter. In another example, the exhaust-gas after-treatment actual value A may be a value for the nitrogen oxide load of the first exhaust-gas after-treatment device 22, embodied as a nitrogen oxide storage catalytic converter. In addition, the exhaust-gas after-treatment actual value A can be a value for a nitrogen oxide content of the exhaust gas 36 downstream of the first exhaust-gas after-treatment device 22, whereby, in particular, a nitrogen oxide slip of the nitrogen oxide storage catalytic converter can be detected. In yet another example, the exhaust-gas after-treatment actual value A may be a sulfur oxide trap actual value. Said sulfur oxide trap actual value may be a value for a sulfur oxide loading, a sulfur oxide load, a sulfur oxide slippage, an oxygen fraction in the exhaust gas or in the charge gas, or for a sulfur oxide trap temperature. In a further example, the exhaust-gas after-treatment actual value A may be a soot loading and/or temperature of a particle filter (DPF). In a yet further example, the exhaust-gas after-treatment actual value A may be a value for an oxygen content of the exhaust gas 36, 37 circulating in the loop. In addition, a temperature of the exhaust gas 36, 37 and/or of an exhaust-gas after-treatment device 22, 23 can also be detected as exhaust-gas after-treatment actual value A. At 64, a set-point value (B) corresponding to the exhaust-gas after-treatment value (as determined in step 62) may be obtained from the memory of the engine control unit. The set-point value may be a pre-defined value of the exhaust-gas after-treatment parameter corresponding to normal vehicle operation.

Subsequently, at 66, a demand check is carried out where the exhaust-gas after-treatment actual value A is compared with the predefined exhaust-gas after-treatment setpoint value B. If the exhaust-gas after-treatment actual value A deviates from the predefined exhaust-gas after-treatment setpoint value B, a demand for the measure is determined and at least one measure for adapting the exhaust-gas composition and/or temperature adjustment is taken in a measure implementation step 74. It is also possible for an extent of the required measure to be determined by way of the demand check 66. Thus, not only the presence of a deviation between the exhaust-gas after-treatment actual value A and the exhaust-gas after-treatment setpoint value B but also a difference between them can be determined. In particular a quantity of the fuel 31 or else of the urea solution which have to be introduced in order to attain the desired state can be determined from the difference. In addition, a time period which the measure takes to reach the desired state can be determined.

Depending on the after-treatment parameter measured and the extent of deviation, different measures may be implemented at step 74. In one example, if, the exhaust-gas after-treatment actual value A for the ammonia loading undershoots the exhaust-gas after-treatment setpoint value B for the ammonia loading, the exhaust-gas after-treatment setpoint value B can be achieved by means of the measure as a result of the introduction of ammonia. This can be done, for example, by injecting urea solution, which then reacts to form ammonia, or by injecting fuel, which induces an exhaust-gas after-treatment device 22, embodied as a nitrogen oxide storage catalytic converter, to produce ammonia (NH$_3$).

In another example, if the exhaust-gas after-treatment actual value A for the nitrogen oxide load of the first exhaust-gas after-treatment device 22, embodied as a nitrogen oxide storage catalytic converter, exceeds the exhaust-gas after-treatment setpoint value B for the nitrogen oxide load, desorption of the nitrogen oxides as a result of temperature adaptation and/or enrichment of the exhaust gas 36 with fuel 31 can be brought about by means of the measure.

The fact that the exhaust-gas after-treatment actual value A for the nitrogen oxide content of the exhaust gas 36 exceeds the exhaust-gas after-treatment setpoint value B for the nitrogen oxide content can be used to determine that the capacity limit of the nitrogen oxide storage catalytic converter is reached downstream of the first exhaust-gas after-treatment device 22, embodied as a nitrogen oxide storage catalytic converter. Reduction of the nitrogen oxides can be carried out by means of the measure being carried out. For carrying out the measure, both LP-EGR and HP-EGR may be supplied to the intake manifold. Due to the direct flow of HP-EGR, the flow rate (space velocity) of exhaust-gas over the nitrogen oxide storage catalytic converter within the LP-EGR loop is reduced. As a result of the reduced flow rate, the residency time of the exhaust-gas in the nitrogen oxide storage catalytic converter may increase thereby improving the effectiveness of the reduction procedure (purging) carried out in the nitrogen oxide storage catalytic converter.

In yet another example, if the sulfur oxide trap actual value A for the sulfur oxide trap temperature lies above the sulfur oxide trap target value B for the sulfur oxide trap temperature, the sulfur oxide trap 22 can be cooled through the use of the charge-air cooler 18 or the exhaust-gas cooler 20. By means of the charge-air cooler 18, the charge gas 35 can be cooled during overrun operation, see FIG. 3. By means of the exhaust-gas cooler 20, the recirculated low-pressure exhaust gas 37 can be cooled during overrun operation. If the sulfur oxide trap actual value A for the sulfur oxide trap temperature lies below the sulfur oxide trap target value B for the sulfur oxide trap temperature, the mass flows can be conducted past the charge-air cooler 18 and/or past the exhaust-gas cooler 20. The recirculated low-pressure exhaust gas 37 may be conducted past the exhaust-gas cooler 20 through the exhaust-gas cooler bypass 21 by virtue of the exhaust-gas cooler bypass valve 28 being opened. The charge gas 35 may be conducted past the charge-air cooler 18 through the charge-air cooler bypass 17 by virtue of the charge-air cooler bypass valve 27 being opened. Various combinations of low-pressure exhaust-gas recirculation, high-pressure exhaust-gas recirculation, fuel introduction and cooling are conceivable which may be implemented in a manner dependent on the sulfur oxide trap actual value A in order to purge the sulfur oxide trap. In yet another example, if the soot load on the particle filter is higher than a set-point value, a burn-off of soot may be performed. In a further example, if the particle filter 22 is at risk of overheating (the particle filter temperature lies above the particle filter target value B for the particle filter temperature), which could arise if the fraction of oxygen in the exhaust gas 36 were to increase during a regeneration phase, the particle filter 22 can be cooled by virtue of the exhaust gas 36 flowing through the particle filter 22 being cooled through the use of the charge-air cooler 18 or the exhaust-gas cooler 20. Alternatively or in addition, the soot can be cooled by way of an injection of fuel into the combustion chamber 34 or into the exhaust tract 13, to a point where the burn-off of soot may be stopped.

It can additionally be determined by testing the oxygen content of the exhaust gas 36 whether the exhaust gas 36 has a composition which is suitable for the desired function. If, for example, the exhaust-gas after-treatment actual value A for the oxygen content lies above the exhaust-gas after-treatment setpoint value B for the oxygen content, the composition of the exhaust gas 36 can be adapted by introducing fuel.

The temperature of the exhaust gas and/or of the exhaust-gas after-treatment devices 22, 23 can also be adapted. f the exhaust-gas after-treatment actual value A for the temperature lies above the exhaust-gas after-treatment setpoint value B, the exhaust-gas after-treatment devices 22, 23 can be cooled by using the charge-air cooler 18 or the exhaust-gas cooler 20.

If, for example, the exhaust-gas after-treatment actual value A for the temperature lies below the exhaust-gas after-treatment setpoint value B for the temperature, the mass flows can be conducted past the charge-air cooler 18 and/or past the exhaust-gas cooler 20. The recirculated exhaust gas 37 may be conducted past the exhaust-gas cooler 20 through the exhaust-gas cooler bypass 21 by virtue of the exhaust-gas cooler bypass valve 28 being opened. The charge gas 35 may be conducted past the charge-air cooler 18 through the charge-air cooler bypass 17 by virtue of the charge-air cooler bypass valve 27 being opened. This is shown in FIG. 2.

The measure can also comprise operating the electric machine 45. The electric machine 45 can, as the engine, assume the task of driving the motor vehicle 10 for a specific time period. The internal combustion engine 11 is meanwhile decoupled from the drive, and is used for the flushing of the exhaust-gas after-treatment devices 22, 23 arranged in the loop. The internal combustion engine is therefore available for the measure for a relatively long time period.

It is also conceivable for the electric machine 45 to be used to drive the internal combustion engine 11 and for the internal combustion engine 11 to be adjusted to or held at a predefined rotational speed. The rotational speed of the internal combustion engine 11 is independent of the current speed of the motor vehicle 10 here. The mass flow through the internal combustion engine 11 varies with the rotational speed of the internal combustion engine 11. The speed of the exhaust gas 37, which circulates in the loop and flushes the exhaust-gas after-treatment devices 22, 23 arranged in the loop, is therefore influenced. In one example, during overrun conditions, at least one switchable cylinder in the internal combustion engine 11 may be deactivated. By means of the cylinder deactivation, the mass flow and flow rate (space velocity) through the exhaust-gas after-treatment devices may be reduced. In this way, due to the reduced flow rate, the residency time of the exhaust-gas in the exhaust-gas after-treatment device may increase thereby improving the effectiveness of the reduction procedure (purging) carried out in the nitrogen oxide storage catalytic converter. Also, during cylinder deactivation, there may be a reduction in total trapped oxygen load in the system that needs to be reacted to achieve rich conditions.

Various combinations of exhaust-gas recirculation, introduction of fuel, introduction of urea solution, cooling and electric machine operation are conceivable and may be implemented as a function of the exhaust-gas after-treatment actual value A.

In the second embodiment (as shown in FIG. 5), on determination of deviation of exhaust gas after-treatment value A from the set-point value B, instead of directly moving on to the implementation step 74, a capability check may be carried out. During the capability check it may be ascertained that under current operating conditions the vehicle is capable of carrying out the required measure. In order to carry out the capability check, at least one selected motor vehicle actual value C is detected in a motor vehicle value detection step 68. The motor vehicle actual value C is detected by the motor vehicle value detection unit 42. The motor vehicle actual value C characterizes the actual state of the motor vehicle 10 and, in particular, of the hybrid drive train. The motor vehicle actual value C can, be a value of the hybrid drive train. The motor vehicle actual value C may thus be a value of a motor vehicle speed, an engine speed, a motor vehicle load, a fuel injection quantity, a brake pedal position, a clutch pedal position or else an accelerator pedal position. In addition, an item of navigation information, an item of cruise control system information, or an item of traffic information may also be detected. The item of navigation information may originate from a system integrated into the motor vehicle or from an external system, and may for example comprise data relating to the position of the motor vehicle, the stored destination or the route topography. The item of traffic information may originate from traffic guidance systems or other motor vehicles via vehicle-to-vehicle communication (V2V).

At 70, a set-point value (D) corresponding to the motor vehicle parameter (as determined in step 68) may be obtained from the memory of the engine control unit. The set-point value may be a pre-defined value of the motor vehicle parameter corresponding to normal vehicle operation.

At 72, the motor vehicle actual value C may be compared, in a capability check, with a predefined motor vehicle setpoint value D. A capability of the motor vehicle 10 to carry out the measure at least at present can be determined by way of the capability check 72. If the capability of the motor vehicle 10 to carry out the measure is determined, said measure is subsequently executed in the measure implementation step 74.

In addition to the check as to whether it is possible to carry out the measure at present, a test can also be carried out in the capability check 72 as to the extent to which said capability is available. For this purpose, a check of the probability of success can be performed in the capability check 72. Here the probability of success indicates the probability of it being possible to carry out the full extent of the measure. In particular, the duration of the measure is focused on here. The duration used as a basis here is in particular a duration determined in the demand check 66 for the successful implementation of the measure. The measure implementation step 74 is executed if the probability of success reaches at least a predefined level.

A driving profile over a defined driving duration is determined and stored with respect to the test of the probability of success. Using said driving profile, the probability of the motor vehicle 10 continuing to be able to implement the measure for a defined duration can then be determined in the probability of success test by means of statistical calculations.

Alternatively or in addition, items of navigation information can be used to determine the probability of success in the capability check 65. Using the items of navigation information, consideration can be given to items of information about the impending driving route. For instance, a characteristic of a section of road ahead, such as an upward slope, can be an indication of an imminent end of overrun operation of the internal combustion engine 11. It can be determined, for example, whether a section of road lying ahead is suitable for driving the motor vehicle 10 solely with the electric machine 45. The maximum length of time for which the internal combustion engine 11 will still be in overrun operation can be determined from the current motor vehicle speed, the current location of the motor vehicle 10 and the distance from the characteristic of the section of road ahead. In the case of a preprogrammed driving route, it is furthermore possible for route sections which appear suitable for a measure implementation step 66 to be defined in a forward-planning manner.

Items of current traffic information can also be used for the test of the probability of success in the capability check 65. Items of traffic information can be gathered, for example, from traffic management systems or vehicle-to-vehicle communications (V2V). An imminent change in operating mode can be predicted in a comparison with the actual state of the motor vehicle 10. Thus, for example, a speed limit ahead indicates an imminent braking maneuver.

All items of motor vehicle information, such as motor vehicle speed, engine speed, motor vehicle load, fuel injection quantity, brake pedal position, clutch pedal position, cruise control system value or else accelerator pedal position, can be used in the operating method 60 according to the disclosure in order to generate a prediction about the imminent maximum duration of the overrun operation of the internal combustion engine 11.

In the operating method according to the disclosure, the exhaust-gas after-treatment setpoint value B and the motor vehicle setpoint value D may, of course, also be value ranges.

In an alternative embodiment, on detection of an overrun condition, the exhaust-gas after-treatment device (such as device 22) may be purged opportunistically without carrying out a demand and capability check. In one example, LP-EGR and/or HP-EGR may be supplied to the engine during overrun operation of the motor vehicle, and fuel may simultaneously be introduced into the engine or into the exhaust tract and the nitrogen oxide adsorber may be flushed through with rich exhaust gas.

In one example, a method for a vehicle having an engine, comprises during an overrun condition, comparing an actual value of an exhaust after-treatment device to a setpoint value, the exhaust after-treatment device coupled in an exhaust tract of the engine; and in the event of a deviation of the actual value from the setpoint value, selectively implementing a measure including feeding charge gas having recirculated exhaust gas to the engine via a loop. In the preceding example, additionally or optionally, the measure further comprises introducing fuel into the loop to enrich the recirculated exhaust gas. In any or all of the preceding examples, additionally or optionally, the vehicle has a hybrid drivetrain including an electric machine, and wherein the measure further comprises operating the electric machine. In any or all of the preceding examples, additionally or optionally, operating the electric machine includes operating the electric machine to drive the vehicle, and wherein during the overrun condition, the vehicle is not driven via the engine. In any or all of the preceding examples, additionally or optionally, operating the electric machine includes operating the electric machine to spin the engine at a specific rotational speed, and wherein during the overrun condition, the vehicle is not driven via the engine. In any or all of the preceding examples, additionally or optionally, the actual value of the exhaust after-treatment device includes one or more of an ammonia loading, a nitrogen oxide load, a sulfur oxide content, a nitrogen oxide content and soot loading of the exhaust after-treatment device. Any or all of the preceding examples further comprises, additionally or optionally, determining an extent of the measure that is implemented based on the deviation. Any or all of the preceding examples further comprises, additionally or optionally, comparing a motor vehicle value representative of an actual state of the motor vehicle to a motor vehicle setpoint value, and wherein selectively implementing the measure includes implementing the measure if the actual state of the motor vehicle corresponds to the setpoint value. In any or all of the preceding examples, additionally or optionally, the motor vehicle value includes one or more of a motor vehicle speed, engine speed, motor vehicle load, fuel injection quantity, brake pedal position, accelerator pedal position, clutch pedal position. In any or all of the preceding examples, additionally or optionally, the motor vehicle value is inferred from one or more of navigation information and traffic information received from a navigation system of the vehicle, and vehicle information received from a cruise control system of the vehicle. In any or all of the preceding examples, additionally or optionally, feeding charge gas having recirculated exhaust gas to the engine via the loop includes feeding charge gas having one or more of low pressure and high pressure recirculated gas, the low pressure recirculated gas including exhaust gas recirculated from downstream of an exhaust turbine to upstream of an intake compressor, the high pressure recirculated gas including exhaust gas recirculated from upstream of the exhaust turbine to downstream of the intake compressor. In any or all of the preceding examples, additionally or optionally, the selectively implementing the measure includes implementing the measure during the overrun condition and wherein the overrun condition includes the engine spinning unfueled, an intake throttle coupled in an intake tract of the engine being closed, and the vehicle being propelled using motor torque from the electric machine. Any or all of the preceding examples further comprises, additionally or optionally, implementing the measure until the actual value is at the setpoint value.

In another example, a vehicle system comprises an electric machine; an internal combustion engine having an intake-air tract, an exhaust tract, an exhaust-gas after-treatment device arranged in the exhaust tract, an exhaust-gas recirculation tract for conducting exhaust gas from the exhaust tract, downstream of the exhaust-gas after-treatment device, to the intake-air tract via a loop, and a valve coupled to each of the intake-air tract and the exhaust-gas recirculation tract; a hybrid drivetrain comprising the electric machine and the internal combustion engine; and a controller with computer readable instructions stored on non-transitory memory for: in response to an actual value of the exhaust-gas after-treatment device deviating from a setpoint value, adjusting the valve to recirculate exhaust gas to the engine while controlling the electric machine during an overrun operation of the engine. In the preceding example, additionally or optionally, the engine further includes at least one of each of a fuel injector and a urea injector for introducing fuel and urea into the loop and a urea injector for introducing urea into the loop, and wherein the controller includes further instructions for introducing one or more of fuel and urea into the loop via the injector to enrich the recirculated exhaust gas. Under a first condition, fuel may be injected into the loop, urea under a second condition urea may be injected into the loop and under a third condition both fuel and urea may be injected into the loop. In any or all of the preceding examples, additionally or optionally, the exhaust-gas after-treatment device is a first exhaust-gas after-treatment device, the engine further comprising a second exhaust-gas after-treatment device arranged downstream of the first exhaust-gas after-treatment device.

In yet another example, a method for a vehicle having an engine, comprises in response to deviation of an actual parameter of an exhaust after-treatment device coupled to an exhaust passage of the engine from a setpoint, recirculating exhaust gas to an intake passage of the engine during an engine overrun condition with an intake throttle closed. In the preceding example, additionally or optionally, the vehicle is a hybrid vehicle further comprising an electric machine, and wherein during the overrun condition, the vehicle is propelled via the machine and not propelled via the engine. Any or all of the preceding examples further comprises, additionally or optionally, during the overrun condition, while propelling the vehicle via the electric machine, spinning the engine, unfueled, via the electric machine at a speed based on the deviation. In any or all of the preceding examples, additionally or optionally, recirculating exhaust gas includes recirculating from the exhaust passage to the intake passage via a loop, an amount of exhaust gas recirculated is based on the deviation and wherein the intake throttle is coupled at a junction between the intake passage and the loop.

In this way during overrun operation, by monitoring a plurality of exhaust-gas after-treatment devices and comparing exhaust-gas after-treatment values with corresponding setpoints, it is possible to implement corrective measures as required and ensure effective functioning of the devices. The technical effect of carrying out corrective measures for exhaust-gas after-treatment devices during overrun operating conditions is that both LP-EGR and HP-EGR may be effectively used for executing the measured. By using EGR, fuel efficiency may be improved and combustion temperature may be reduced thereby reducing an amount of NOx generated during the combustion. By including fuel and urea injectors in the exhaust passage, it is possible to enrich the EGR as required for a specific operation, limiting the overall fuel consumption.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle having a controller and a hybrid drivetrain including an engine and an electric machine, the method comprising executing computer readable instructions stored on non-transitory memory that, when executed, cause the controller to:
   operate the engine in an overrun condition in which the engine is decoupled from a drive of the vehicle, the engine spins unfueled, and an intake throttle coupled in an intake-air tract is closed;
   during operation of the engine in the overrun condition, compare a value which characterizes a current state of an exhaust after-treatment device coupled in an exhaust tract of the engine to a setpoint value, and responsive to deviation therebetween, operate the electric machine to spin the engine at a rotational speed based on the deviation, and implement a measure including feeding charge gas having recirculated exhaust gas to the engine via a loop.

2. The method of claim 1, wherein the measure further comprises sending a signal to an actuator to introduce fuel into the loop to enrich the recirculated exhaust gas.

3. The method of claim 1, wherein operating the electric machine includes operating the electric machine to drive the vehicle, and wherein during the overrun condition, the vehicle is not driven via the engine.

4. The method of claim 1, wherein during the overrun condition, the vehicle is not driven via the engine.

5. The method of claim 1, wherein the value which characterizes the current state of the exhaust after-treatment device includes one or more of an ammonia loading, a nitrogen oxide load, a sulfur oxide content, a nitrogen oxide content, and a soot loading of the exhaust after-treatment device.

6. The method of claim 1, further comprising executing computer readable instructions stored on the non-transitory memory that, when executed, cause the controller to compare a motor vehicle value representative of a current state of the motor vehicle to a motor vehicle setpoint value, and responsive to determining based on the comparison that the motor vehicle value corresponds to the motor vehicle setpoint value, implement the measure.

7. The method of claim 6, wherein the motor vehicle value includes one or more of a motor vehicle speed, engine speed, motor vehicle load, fuel injection quantity, brake pedal position, accelerator pedal position, and clutch pedal position.

8. The method of claim 6, wherein the motor vehicle value is inferred from one or more of navigation information and traffic information received from a navigation system of the vehicle, and vehicle information received from a cruise control system of the vehicle.

9. The method of claim 1, wherein feeding charge gas having recirculated exhaust gas to the engine via the loop includes feeding charge gas having one or more of low pressure recirculated gas and high pressure recirculated gas, the low pressure recirculated gas including exhaust gas recirculated from downstream of an exhaust turbine to upstream of an intake compressor, the high pressure recirculated gas including exhaust gas recirculated from upstream of the exhaust turbine to downstream of the intake compressor.

10. The method of claim 1, wherein during the overrun condition, the vehicle is propelled using motor torque from the electric machine.

11. The method of claim 1, further comprising implementing the measure until the value which characterizes the current state of the exhaust after-treatment device is at the setpoint value.

12. The method of claim 1, wherein the rotational speed is independent of a current speed of the vehicle.

13. The method of claim 12, wherein a speed of the engine is kept constant at the rotational speed during the measure via the operation of the electric machine.

14. A vehicle system, comprising:
an electric machine; an internal combustion engine having an intake-air tract, an exhaust tract, an exhaust-gas after-treatment device arranged in the exhaust tract, an exhaust-gas recirculation tract configured to conduct exhaust gas from the exhaust tract, downstream of the exhaust-gas after-treatment device, to the intake-air tract via a loop, and a valve, the valve coupled to each of the intake-air tract and the exhaust-gas recirculation tract; and a hybrid drivetrain comprising the electric machine and the internal combustion engine; and
a controller with computer readable instructions stored on non-transitory memory, the instructions executable by a processor to:
operate the engine in an overrun condition in which the engine is decoupled from a drive of the vehicle, the engine spins unfueled, and an intake throttle coupled in the intake-air tract is closed;
during operation of the engine in the overrun condition, compare a value which characterizes a current state of the exhaust-gas after-treatment device to a setpoint value, and responsive to a deviation therebetween, operate the electric machine to spin the engine at a rotational speed based on the deviation, and recirculate exhaust gas to the engine by sending a signal to an actuator of the valve to adjust the valve.

15. The system of claim 14, wherein the engine further includes each of a fuel injector configured to introduce fuel into the loop and a urea injector configured to introduce urea into the loop, and wherein the instructions further include instructions executable by the processor to send a signal to the injectors to enrich the recirculated exhaust gas by introducing one or more of fuel and urea into the loop via the injector.

16. The system of claim 14, wherein the exhaust-gas after-treatment device is a first exhaust-gas after-treatment device, the engine further comprising a second exhaust-gas after-treatment device arranged downstream of the first exhaust-gas after-treatment device.

17. A method for a hybrid vehicle having a controller, an engine, and an electric machine, the method comprising executing computer readable instructions stored on non-transitory memory that, when executed, cause the controller to:
determine whether a parameter characterizing a current state of an exhaust after-treatment device coupled to an exhaust passage of the engine deviates from a setpoint, and if so, send a signal to an actuator of a valve to recirculate exhaust gas to an intake passage of the engine during an engine overrun condition in which an intake throttle is closed, the electric machine spins the engine, the engine is decoupled from a drive of the vehicle, and the vehicle is propelled using motor torque from the electric machine and not via the engine.

18. The method of claim 17, further comprising executing computer readable instructions stored on the non-transitory memory that, when executed, cause the controller to spin the engine unfueled with the electric machine during the overrun condition at a rotational speed determined by the controller based on the deviation.

19. The method of claim 17, further comprising executing computer readable instructions stored on the non-transitory memory that, when executed, cause the controller to determine an amount of exhaust gas to recirculate, and recirculate the amount of exhaust gas from the exhaust passage to the intake passage via a loop, wherein the intake throttle is coupled at a junction between the intake passage and the loop.

20. The system of claim 14, wherein the rotational speed is independent of a current speed of the vehicle.

* * * * *